(12) United States Patent
Hill (10) Patent No.: US 10,813,343 B1
(45) Date of Patent: Oct. 27, 2020

(54) ANIMAL FEEDER

(71) Applicant: Classic Brands, LLC, Denver, CO (US)

(72) Inventor: David S. Hill, San Antonio, TX (US)

(73) Assignee: Classic Brands, LLC, Denver, CO (US)

( * ) Notice: Subject to any disclaimer, the term of this patent is extended or adjusted under 35 U.S.C. 154(b) by 1117 days.

(21) Appl. No.: 15/013,063

(22) Filed: Feb. 2, 2016

Related U.S. Application Data (63) Continuation-in-part of application No. 14/947,928, filed on Nov. 20, 2015, now Pat. No. 9,655,345, which is a continuation-in-part of application No. 14/455,092, filed on Aug. 8, 2014, now Pat. No. 9,192,148, which is a continuation of application No. 13/784,392, filed on Mar. 4, 2013, now Pat. No. 8,893,659, which is a continuation-in-part of application No. 13/092,285, filed on Apr. 22, 2011, now Pat. No. 8,387,567.

(60) Provisional application No. 61/326,736, filed on Apr. 22, 2010.

(51) Int. Cl.
*A01K 39/02* (2006.01)
*A01K 39/04* (2006.01)

(52) U.S. Cl.
CPC .......... *A01K 39/0206* (2013.01); *A01K 39/04* (2013.01)

(58) Field of Classification Search
CPC .. A01K 5/0114; A01K 5/0135; A01K 5/0142; A01K 5/01; A01K 7/005; A01K 7/00; A01K 39/0206; A01K 39/04
USPC ....... 119/72, 61.5, 51.5, 61.54, 51.01, 61.53, 119/51.11, 61.57, 63
See application file for complete search history.

(56) References Cited

U.S. PATENT DOCUMENTS

| | | | | |
|---|---|---|---|---|
| 2,584,301 A | * | 2/1952 | Sinclair | A01K 5/01 119/61.53 |
| 3,651,787 A | * | 3/1972 | Cooper | A01K 5/0114 119/51.01 |
| 4,044,723 A | * | 8/1977 | Fitzpatrick | A01K 5/0114 119/61.5 |
| 4,653,431 A | * | 3/1987 | Owen | A01K 5/01 119/61.5 |
| 5,526,773 A | * | 6/1996 | Richardson | A01K 5/0135 119/51.5 |
| 5,560,316 A | * | 10/1996 | Lillelund | A01K 5/0114 119/61.5 |
| 5,730,081 A | * | 3/1998 | Tsengas | A01K 5/0114 108/156 |
| 5,775,255 A | * | 7/1998 | Louviere, III | A01K 5/0142 119/51.5 |
| 6,044,797 A | * | 4/2000 | Leason | A01K 7/00 119/51.11 |

(Continued)

*Primary Examiner* — Yvonne R Abbott-Lewis
(74) *Attorney, Agent, or Firm* — Polsinelli P.C.

(57) ABSTRACT

An animal feeder for use in dispensing a feeding solution to birds or other suitable animals. This may be accomplished by providing an animal feeder having a reservoir containing a feeding solution. The reservoir has walls that do not have a pre-formed opening. The walls are made from a material being sufficiently pliable to allow a user to perforate the walls to form one or more openings in the walls. One or more reservoirs may be set on a tray to orient each reservoir to allow birds or other suitable animals to feed from the openings in each reservoir. The reservoirs are disposable and replaceable to provide a re-useable system for feeding birds.

3 Claims, 8 Drawing Sheets

(56) References Cited

U.S. PATENT DOCUMENTS

| | | | | |
|---|---|---|---|---|
| 6,145,474 A * | 11/2000 | Lemkin | ............ | A01K 5/01 |
| | | | | 119/61.5 |
| 6,209,487 B1 * | 4/2001 | Quinlan | ............ | A01K 5/0114 |
| | | | | 119/51.01 |
| 7,124,709 B1 * | 10/2006 | Greer | ............ | A01K 5/0114 |
| | | | | 119/61.5 |
| 8,516,975 B2 * | 8/2013 | Becattini, Jr. | ............ | A01K 7/005 |
| | | | | 119/51.5 |
| 8,833,305 B2 * | 9/2014 | Macpherson | ............ | A01K 5/0142 |
| | | | | 119/61.5 |

* cited by examiner

ANIMAL FEEDER

CROSS-REFERENCE TO RELATED APPLICATIONS

This application is a continuation-in-part of, and claims the benefit of, the prior application having Ser. No. 14/947,928 entitled TILTING FEEDER, filed on Nov. 20, 2015, the entire contents of which are incorporated herein by reference for all purposes. Prior application Ser. No. 14/947,928 is a continuation in part of, and claims benefit of the filing date, of U.S. patent application Ser. No. 14/455,092 entitled APPARATUS FOR FEEDING BIRDS, filed on Aug. 8, 2014 and issued as U.S. Pat. No. 9,192,148, the entire contents of which are incorporated herein by reference for all purposes. Prior application Ser. No. 14/455,092 is a continuation of, and claims benefit of the filing date, of U.S. patent application Ser. No. 13/784,392 entitled HUMMINGBIRD FEEDING APPARATUS filed Mar. 4, 2013, now issued as U.S. Pat. No. 8,893,659, which relates to, and claims the benefit of the filing date of, U.S. patent application Ser. No. 13/092,285 entitled HUMMINGBIRD FEEDING APPARATUS, filed Apr. 22, 2011, now issued as U.S. Pat. No. 8,387,567, which relates to, and claims the benefit of the filing date of, U.S. provisional patent application Ser. No. 61/326,736 entitled APPARATUS FOR FEEDING BIRDS, filed Apr. 22, 2010, the entire contents of each which are incorporated herein by reference for all purposes.

BACKGROUND OF THE INVENTION

The present invention relates to feeders for animals, for instance feeders for hummingbirds. Hummingbird feeders are a source of enjoyment for bird and nature enthusiasts. A hummingbird feeder is typically a reservoir that dispenses or makes available a food source to a hummingbird, namely nectar. Nectar typically comprises a sugar and water solution.

Some hummingbird feeders rely on a nozzle positioned below or under a reservoir of liquid hummingbird solution that mimics the nourishment found in nature. The weight of the feeding solution pushes the solution to the access point of the nozzle. The nozzle functions as a valve that should control the flow of feed solution by holding feed solution inside the nozzle until a hummingbird disturbs the nozzle to access the feed solution.

These hummingbird feeders tend to leak due to either the undesired flow from the nozzle, for example due to temperature changes, spoilage of the feed solution, and the wind moving the feeder, among other causes. Also, when a hummingbird disturbs the nozzle, it initiates a flow of feed solution from the feeder that results in the hummingbird releasing more feeding solution than it can ingest. Leakage furthermore attracts unwanted pests, such as ants and wasps that tend to contaminate the feed solution. What is needed are improved feeders for feeding hummingbirds, and other animals, while reducing the waste of feed solution.

SUMMARY

The present invention provides animals feeders and methods providing one or more reservoirs containing a feed solution. Each reservoir has walls having no preformed opening. A user punches the walls to make one or more openings to allow an animal to access the feed solution. One or more feeders are set on a tray to position the feeders in an orientation to allow animals to access the openings. The feeders are replaceable once the feeders are emptied.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. Additionally, for the most part, specific details and the like have been omitted inasmuch as such details are not considered necessary to obtain a complete understanding of the present invention, and are considered to be within the understanding of persons of ordinary skill in the relevant art.

Figure 1:
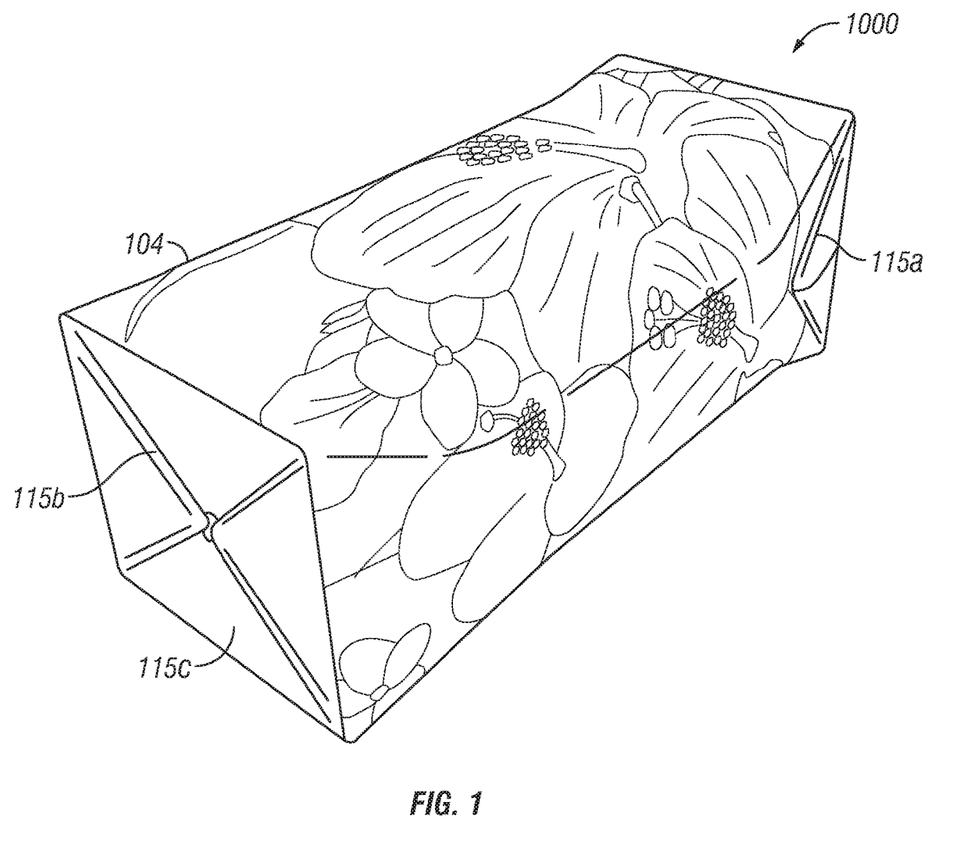
FIG. 1 is a perspective view of a feeder.
Figure 4:
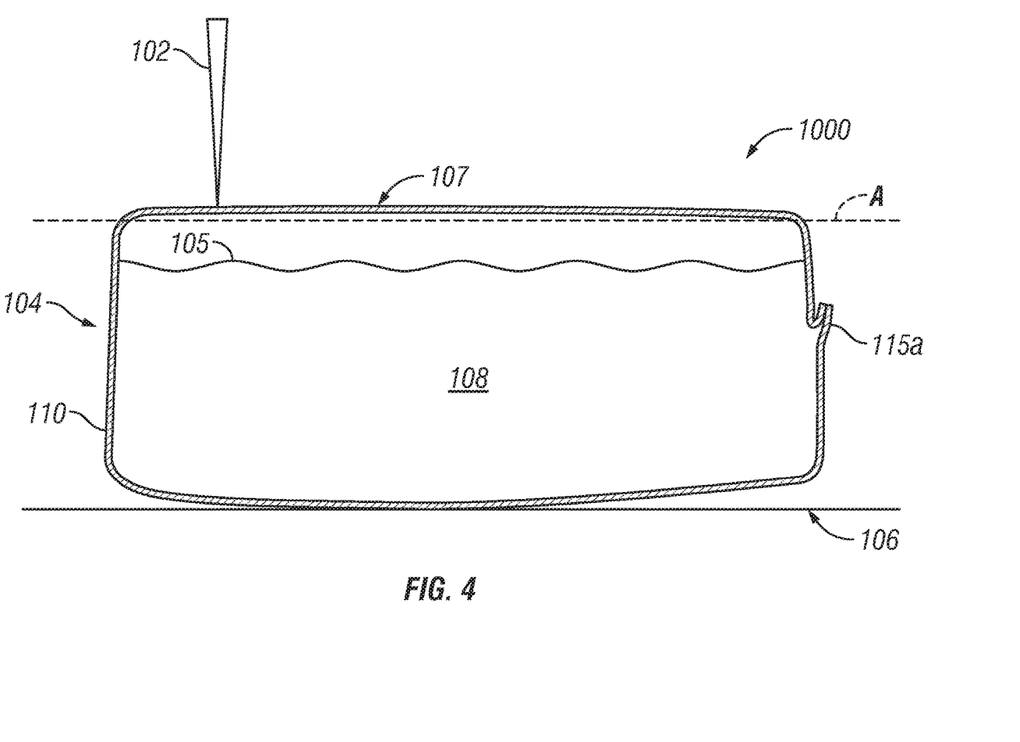
FIG. 4 is a first illustration of a cross-sectional view taken along line B-B, shown in FIG. 3.

Referring to FIG. 1, there is shown a first embodiment of a bird feeder 1000 (referred to also as "feeder 1000"). The feeder 1000 may contain a liquid feed solution 105, as shown in FIG. 4, prepared to nourish a bird. It will be understood by persons skilled in the field of art of the invention that the feeder 1000 may be configured for feeding other non-human animals, including but not limited to other birds and animals, by providing a suitable feed solution.

Referring to FIG. 4, the feed solution 105 may be contained within a reservoir 104 forming a cavity for holding the feed solution. The reservoir 104 may comprise walls 110 being substantially contiguous and uniform in material forming a barrier around the entire volume of the cavity to maintain the freshness of the feed solution 105 contained in the cavity. In other embodiments, the walls 110 may be formed from a composite of materials that form a substantially contiguous and uniform barrier.

As shown in FIG. 4, the walls 110 may not have any pre-formed, break, holes or other openings in the walls 110, prior to a user poking or punching a hole in the walls 110. The material that the walls 110 are made from may be sufficiently pliable to allow a user to puncture the walls 110 to form one or more openings.

Figure 2:
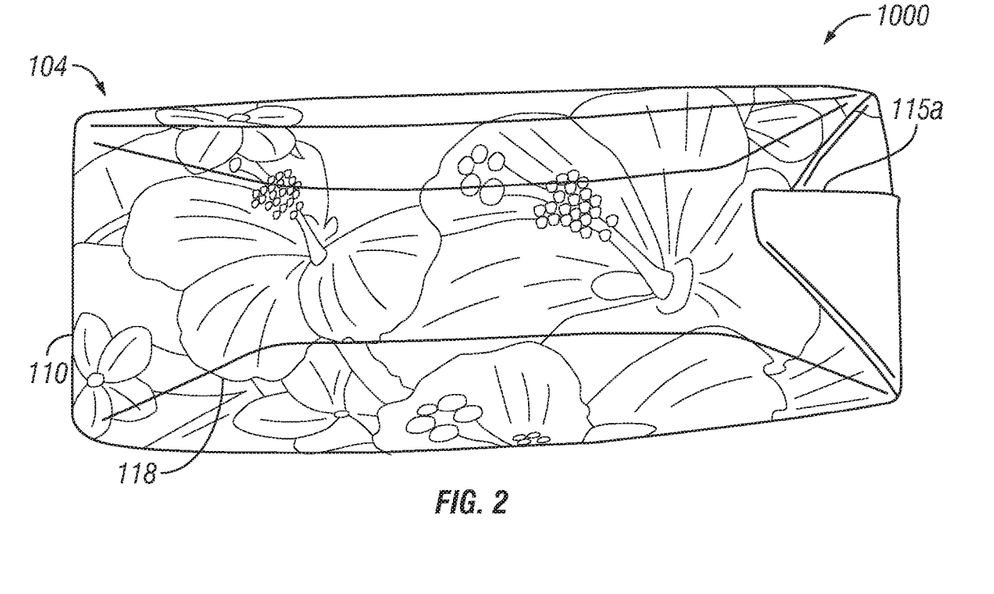
FIG. 2 is a side view of a feeder.

Referring to FIGS. 1, 2, and 4, the walls 110 may form a box shape or other suitable container shape. The material of the walls 110 are sufficiently sturdy to maintain the shape or form of the reservoir. In some embodiments, the walls 100 may be made from materials produced by Tetra Pak Cheese & Powder of Rockford Ill. (http://www.tetrapak.com/us/), other, in other embodiments, made from metal, paper, plastic, composite or layered combinations of these materials or other materials suitable for the purposes described herein. By example, reservoirs made from materials disclosed in U.S. Pat. Nos. 8,387,567, 8,893,659, and 9,192,148 to Hill may be suitable, as well as other suitable materials known by persons ordinarily skilled in the art. The material of the walls 110 may be made from disposable materials that are designed to be discarded or recycled after the feeder is no longer useful, for example after the feeder 1000 opened and emptied of the feeding solution 105.

Referring to FIGS. 1 and 4, the reservoir 104 may comprise at least a top surface 107 extending substantially in a first plane A. It will be understood by persons skilled in the art that the walls 110 may include, in some sections, folded portions 115a, b, c of the walls 110 where for purposes of construction of the reservoir 104 the walls are folded over.

The reservoir 104 may be configured to be set on an underlying surface 106. The feeding solution 105 may settle within the reservoir 104 such that the feeding solution 105 forms a pool 108 below the top surface 107.

Figure 5:
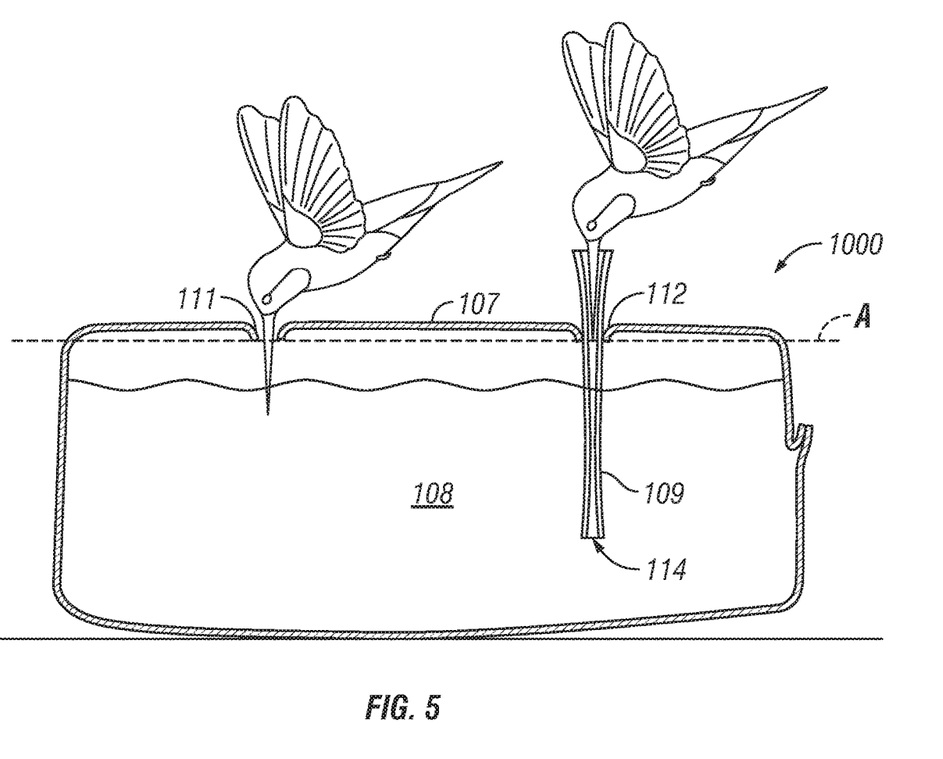
FIG. 5 is a second illustration of the cross-sectional view of the feeder of FIG. 4.

Referring to FIGS. 4 and 5, and illustrative of at least one method for feeding hummingbirds or other suitable animal, a user may use a suitably sharp or pointed object such as a punch 102 to puncture the walls 110 to form an opening 111 for a bird or other suitable animal to access the pool 108 of feed solution 105. In some embodiments, a user may use the punch 102 to form two or more openings 111, 112 in the top surface 107 of the walls 110. The openings 111, 112 may each be positioned substantially in the same plane A, in which the top surface 107 extends.

In some embodiments, such as that shown in the FIG. 5, a feeding port 109 may be inserted into the opening 112. The feeding port 109 may comprise a dispenser channel 114 formed by an axially-extended structure, such as a tube. The width or diameter of the channel 114 or the width or diameter of the opening 111 is sufficiently narrow to allow passage of the bill of a bird (or access by another animal for which the feeder 1000 is designed) but to minimize exposure of the pool 108 of feeding solution 105 to the outside environment, including weather and insects, which may prevent premature spoilage and contamination. For hummingbirds, drinking the feed solution 105 from a narrow tube, such as the feeding port 109, also mimics drinking nectar from flowers.

Referring to FIG. 2, the external side of the walls 110 of the reservoir 104 may comprise a color, texture, pattern or other suitable perceptible element 118 that is attractive to birds or other animals for which the feeder 1000 is designed. These perceptible elements 118 may be designed to draw desired animals to the feeder 1000 to enhance the enjoyment of feeding the desired animals. In FIG. 2, the perceptible element 118 of feeder 1000 is a floral pattern, which may include colors like red or yellow, or other combination that attracts the animal. The feeding port 109 (shown in FIG. 5) and other parts of the feeder 1000 may also include perceptible elements that work in combination with the perceptible elements 118. In other embodiments, the perceptible elements 118 may be designed to deter unwanted animals or other living organisms (e.g. insects, bacteria, etc.) from interfering with use of, consumption of, or access to the feeding solution 105. In other embodiments, the feeder 1000 may include other known decorative elements, i.e. colors, textures or patterns intended to be decorative for the environment that the feeder 1000 is used.

Figure 3:
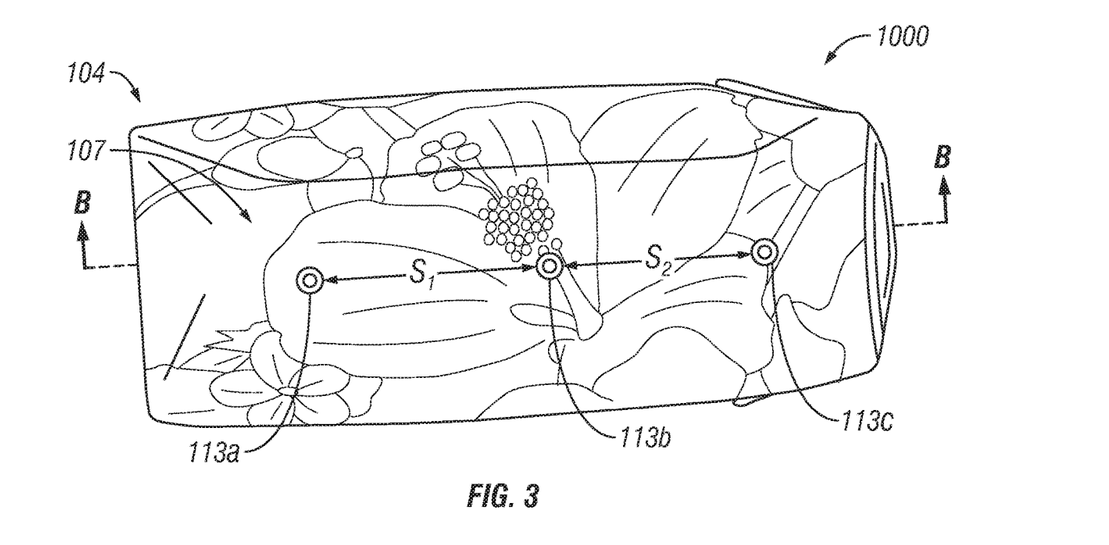
FIG. 3 a top view of a feeder, showing a cross-sectional line B-B taken across the feeder.

Referring to FIG. 3, the top surface 107 may comprise markers 113 a, b, and c. The markers 113a, b, c may comprise indicators, such as the circles shown, printed on the top surface 107 to assist the user in punching holes, such as openings 111 and 112 shown in FIG. 5, in the walls 110 of the feeder 1000. The markers 113a, b, c may provide a recommended spacing S1 and S2 between holes.

Feeder Tray

Figure 6:
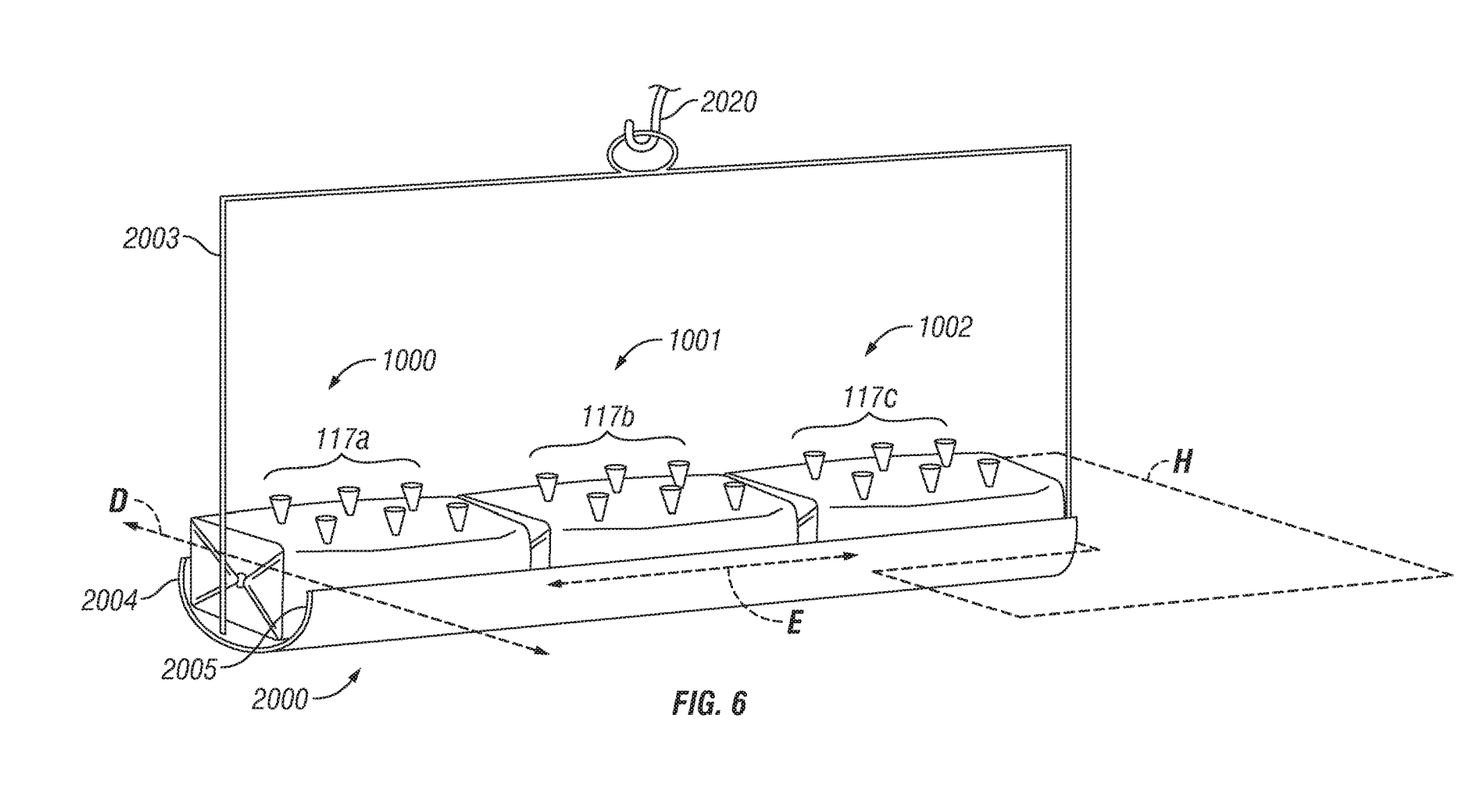
FIG. 6 is a first view of a first feeder tray.
Figure 8:
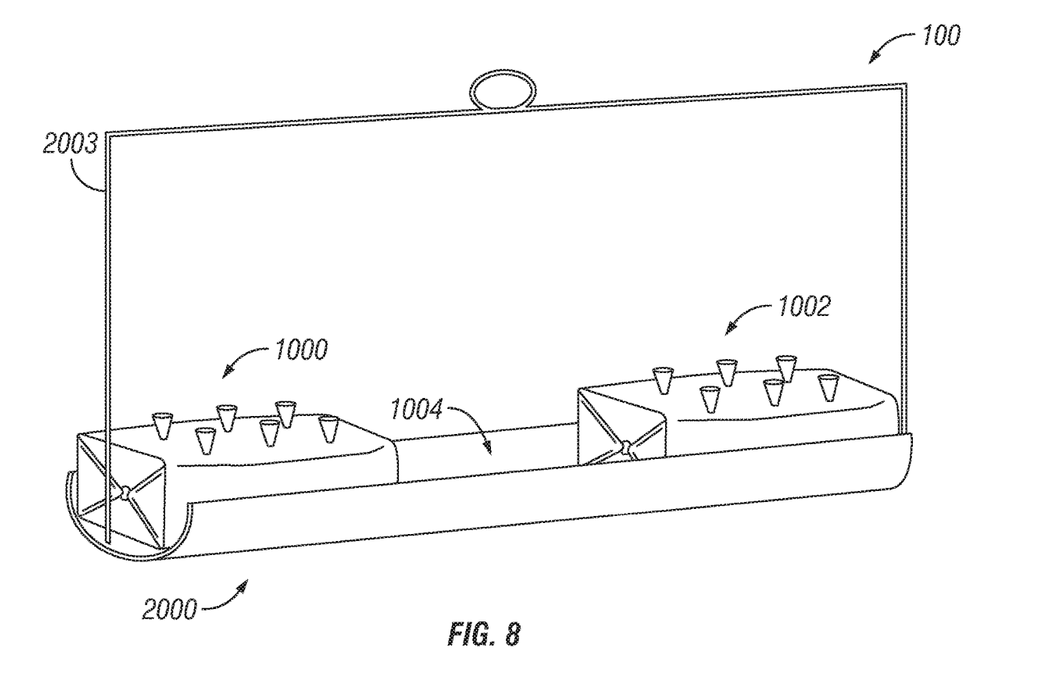
FIG. 8 is a second view of the first feeder tray of FIG. 6.

Referring to FIGS. 6 and 8, one or more feeders 1000, 1001, 1002 may be positioned on a feeder tray 2000. As shown in FIG. 6, a first feeder 1000, a second feeder 1001, and a third feeder 1002 may be set on the feeder tray 2000 in a configuration that orients the set of openings 117a, 117b, 117c of each feeder 1000, 1001, 1002 for access by a hummingbird or other suitable animal. In some embodiments, the one or more feeders 1000, 1001, 1002 may comprise the same configuration as feeder 1000 shown in FIGS. 1-5 and described herein.

Figure 7:
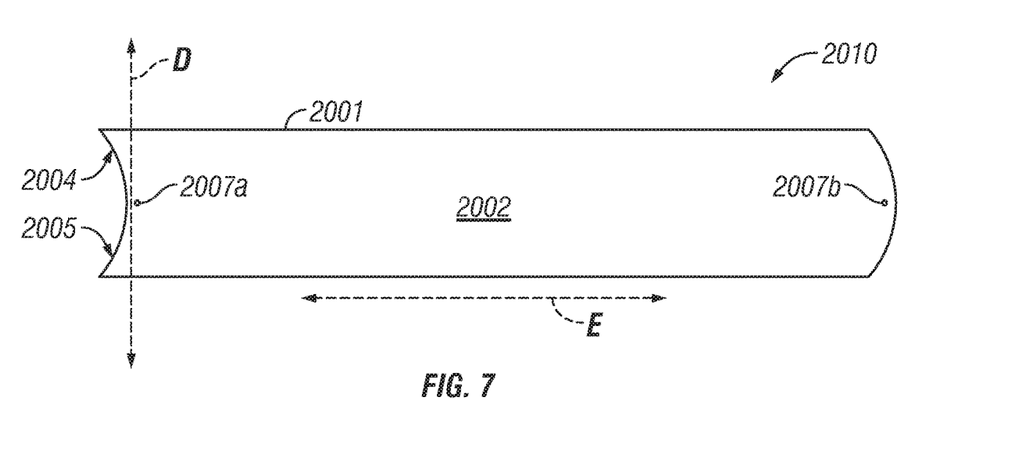
FIG. 7 is a top view of the first feeder tray of FIG. 6.

Referring to FIGS. 6 and 7, the feeder tray 2000 may comprise a shallow flat receptacle having a first surface 2002 for carrying or holding the feeders 1000, 1001, 1002. Each feeder 1000, 1001, 1002 may be set onto the first surface 2002.

The feeder tray 2000 may comprise raised edges 2004, 2005 forming walls, which may restrict motion of the feeders 1000, 1001, 1002 within the horizontal plane H in at least one dimension without the use of mechanical fasteners. As shown in FIGS. 6 and 7, the feeders 1000, 1001, 1002 are restricted from movement in a first direction D by the raised edges 2004, 2005, which may extend from the surface 2002. The feeders 1000, 1001, 1002 may also be restricted from movement in a second direction E by their placement adjacent or between other feeders. The feeders 1000, 1001, 1002 may be removable and replaceable with other feeders once the reservoir of the feeder is emptied. As shown in FIG. 8, feeder 1001 has been removed from area 1004, which is an available area for placing a new replacement feeder. It will be understood by persons skilled in the art that other means of holding and restricting movement of the feeders 1000, 1001 in a removable and replaceable manner on the first surface 2002 of the feeder tray 2000 may be used, including, but not limited to, cages, straps, partitions, adhesives, and mechanical fasteners. In other embodiments, the feeders 1000, 1001 may be permanently attached, and not removable without destruction or disassembly of the feeder tray 2000, such that the feeder tray 2000 and attached feeders 1000, 1001 may be entirely disposable.

Figure 9:
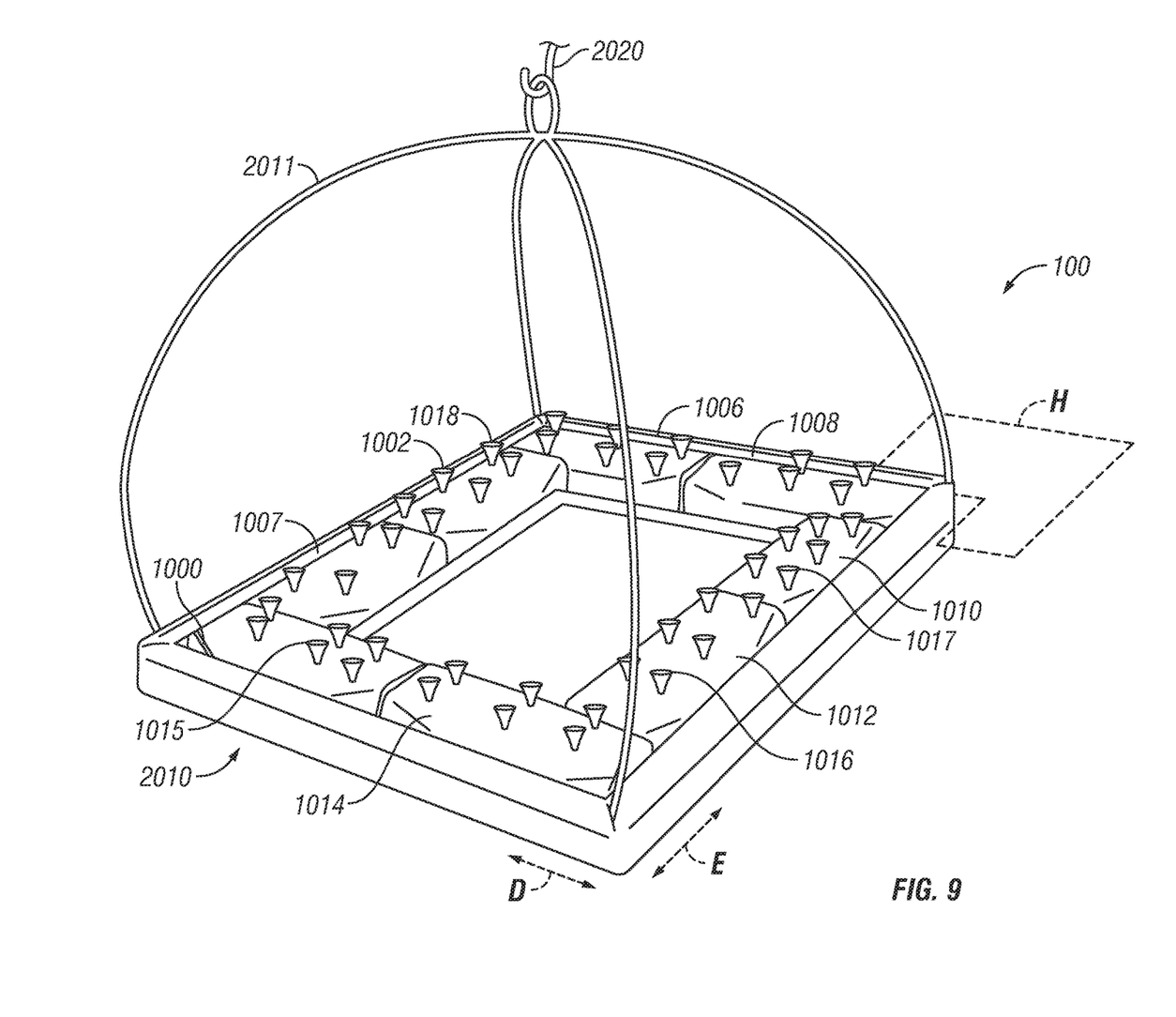
FIG. 9 is an illustration of a second feeder tray.

As shown by FIGS. 6 and 9, a feeder tray 2000 or 2010 may comprise a shape. FIG. 6 shows the feeder tray 2000 in a line segment shape. FIG. 9 shows the feeder tray 2010 in a generally square shape. It will be understood by persons skilled in the art that the shape of a feeder tray, as described herein, may comprise other shapes, including but not limited to open linear segments and closed line segments, extending in a single plane or extending in three dimensions, that arrange the feeders in an accessible position and orientation for feeding birds or other suitable animals.

Figure 10:
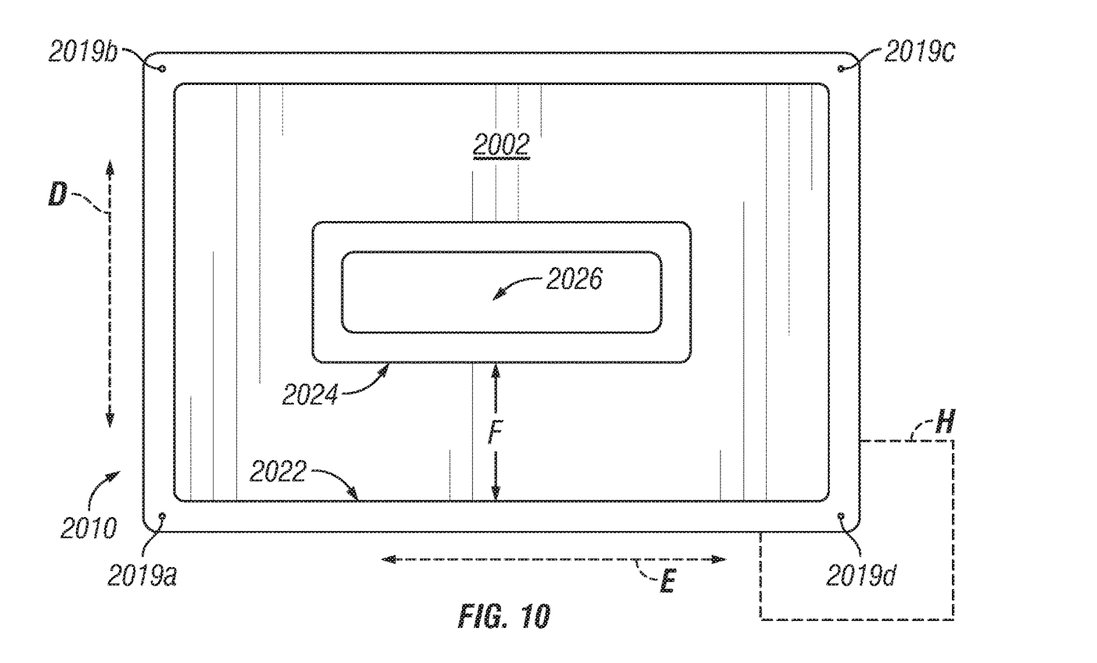
FIG. 10 is a top view of the second feeder tray of FIG. 9.

Referring to FIGS. 9 and 10 showing the feeder 2010 having a square closed shape, the feeder 2010 may comprise a shallow flat receptacle having a first surface 2002 for carrying or holding one or more feeders 1000, 1001, 1002, 1006, 1008, 1010, 1012, 1014, which each have openings or feeding ports (for example ports 1015, 1016, 1017, 1018). As shown in FIG. 9, the first surface 2002 may extend substantially in at least a first horizontal plane H to receive the feeders 1000, 1001, 1002, 1006, 1008, 1010, 1012, 1014 and position the feeding ports to be accessible to a bird or other suitable animal. In some embodiments, the one or more feeders 1000, 1001, 1002, 1006, 1008, 1010, 1012, 1014 may comprise the same configuration as feeder 1000 shown in FIGS. 1-5 and described herein.

Referring to FIG. 10, the feeder tray 2010 may comprise a first side wall 2022, which runs along the outer perimeter of the square shape formed by the feeder tray 2010, and a second side wall 2024, which runs along an inside perimeter of the feeder tray 2022. The first side wall 2022 and the second side wall 2024 may be spaced from each other a distance F, and depending on the size of the shape, there may be a gap 2026, comprising an area within the shape where there are no feeders. It will be understood by persons skilled in the art that in some embodiments this area may be configured to fit additional feeders.

The first side wall 2022 and the second side wall 2024 may restrict motion of the feeders 1000, 1001, 1002 within the first horizontal plane H in at least one dimension without the use of mechanical fasteners. As shown in FIGS. 9 and 10, the feeders 1001, 1002 are restricted from movement in the direction D by at least a portion of the first side wall 2022 and the second side wall 2024. Other portions of the side walls 2022, 2024 restrict movement in the direction E, by example feeders 1014, 1015. In other embodiments other walls, stops, straps, partitions, mechanical fasteners and adhesives may be utilized to provide either replaceable feeders or feeders that are permanently affixed. In other embodiments, the feeder trays 2000 and 2010 shown in FIGS. 6 and 9 may comprise two or more horizontal planes H for reception of two or more reservoirs, for example in a tiered configuration as shown in FIG. 11 showing plane $H_1$ and $H_2$.

Referring to FIG. 9, feeders may be arranged end-to-end on the feeder tray 2010 to match the shape of the respective feeder tray. In FIG. 9, the feeders are arranged on the outer perimeter of the square shape to position the ports 1015, 1016, 1017, 1018 (by example) for access and to discourage crowding of birds gathering at the feeder tray 2000.

The feeders 2000 and 2010 of FIGS. 6 and 9, respectively, may each be suspended from a location that is accessible to hummingbirds, other birds, or other animal for which the feeders useful. Referring to FIG. 6, a hanger 2003 or other suitable extension configured with a receptacle or aperture to receive a suitable support member (for example a hook 2020) may connect to the feeder 2000. In FIG. 9, a hanger 2011 may connect to the feeder 2010. Each hanger 2003, 2011 may connect to the respective feeder tray 2000, 2010 at apertures 2007a, b (shown in FIG. 7) and 2019a-d (shown in FIG. 10), respectively.

Figure 11:
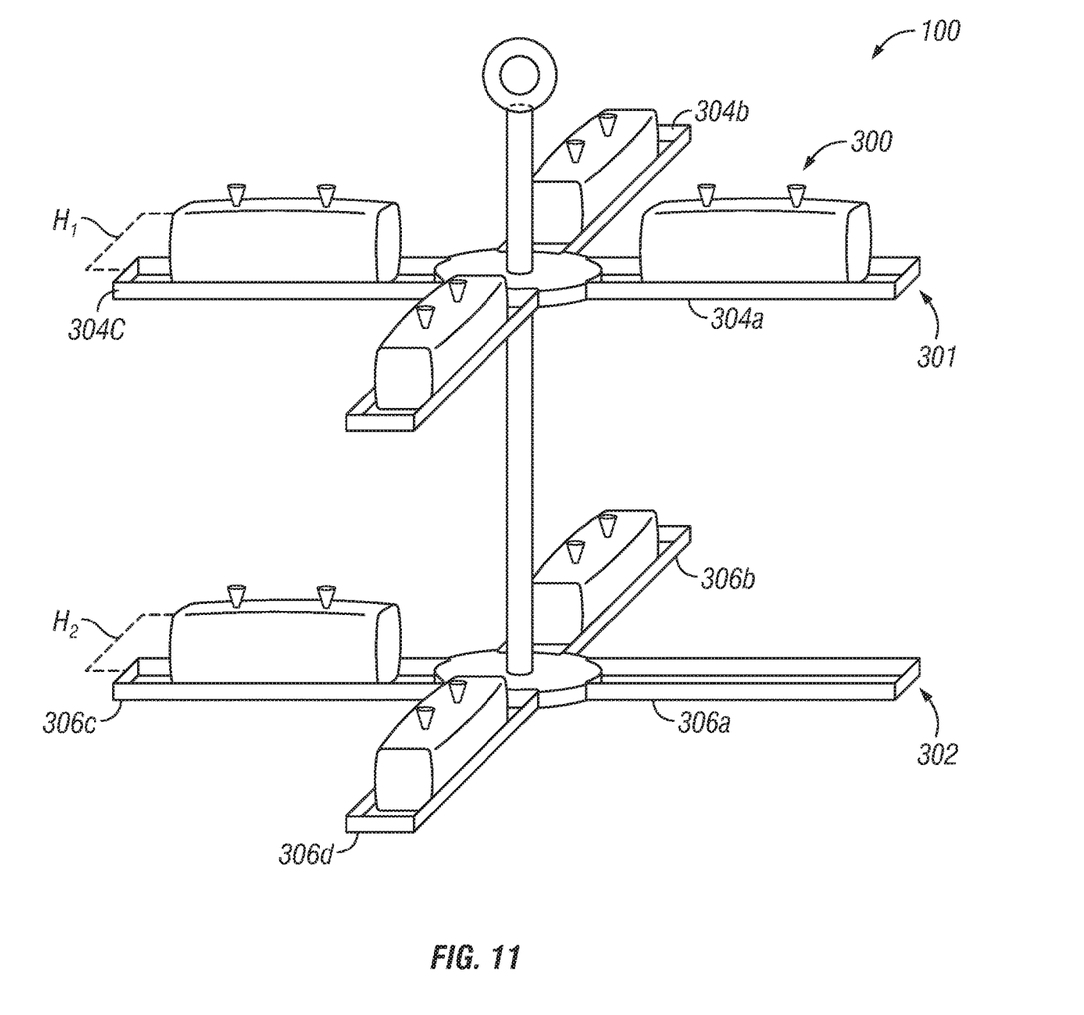
FIG. 11 is an illustration of a third feeder tray.

Referring now to FIG. 11 there is shown a tiered embodiment of the feeder system 100. A feeder tray 300 may comprise one or more tiers 301 and 302, extending in one or more horizontal planes $H_1$ and $H_2$. Each tier may comprise a level placed one above another level.

Each tier 301, 302 may comprise one or more tray sections 304a-d and 306a-d configured to hold one or more feeders 1000a-d and 1001a-c, respectively. Each tray section may be suitable for holding one or more feeders in at least the manner shown and described in FIGS. 6-10, including, but not limited to, the use of walls, cages, straps, partitions, adhesives, and mechanical fasteners for either the replaceable or permanent positioning of the feeders on the tray section. In some embodiments, the tiers 301 and 302 may comprise different sizes and configurations (e.g. the number of tray sections and number of feeders held in each tray section and tier), while in other embodiments the tiers are of the same size and configuration.

Referring to FIGS. 8, 9, and 11, a feeder system 100, embodying at least one method of feeding hummingbirds or other suitable animal, may comprise at least one tray, for example, the tray 2000 shown in FIG. 8, the tray 2010 shown in FIG. 9, or the tray sections 304a-d in the tier 301 of FIG. 11. Each tray of the feeder system 100 holds one or more feeders, for example, in FIG. 8, the tray 2000 holds feeders 1000 and 1002. In some embodiments, the feeders are replaceable once the feeder is used. The feeder system 100 allows the user to have a reusable platform for providing fresh feeding solution to hummingbirds or other desired animals.

Alternative Embodiment of Feeder

Figure 12:
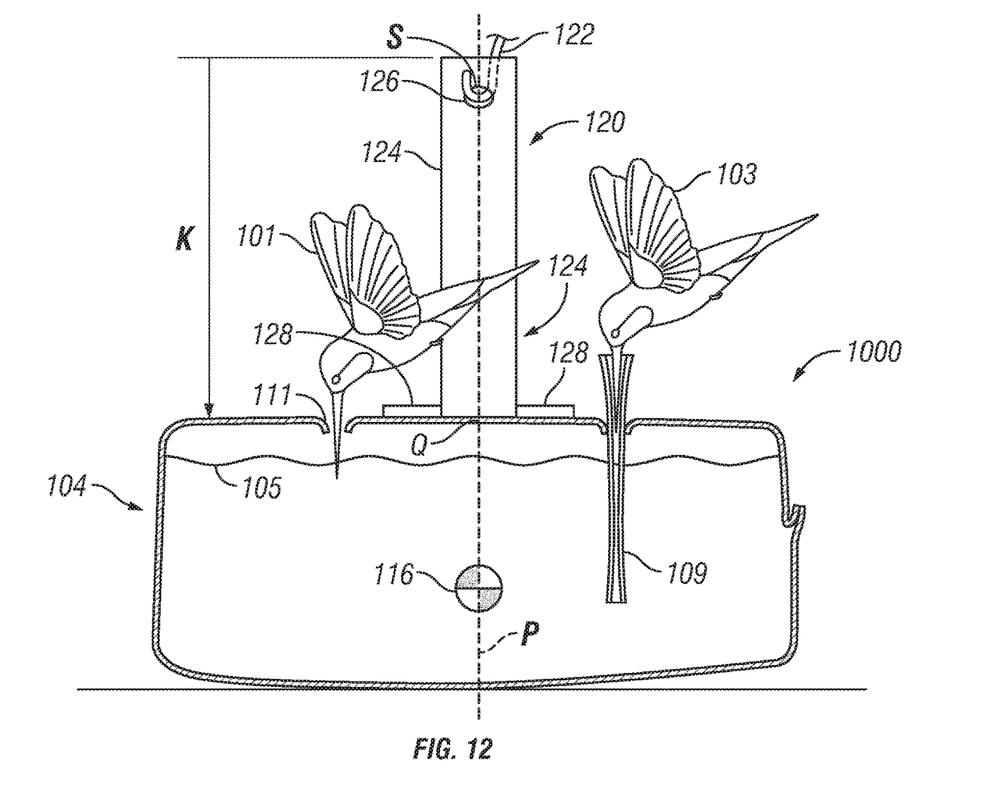
FIG. 12 is an illustration of an alternative embodiment of a feeder.

Referring to FIG. 12, the feeder 1000 of FIG. 1 may be suspended from a location that is accessible to hummingbirds, other birds, or other animal for which the feeder 1000 is useful. In the embodiment shown in FIG. 12, the feeder 1000 may comprise a hanger 120 or other suitable extension configured to receive a hook 122 or other suitable support member and to suspend the reservoir 104 above an underlying surface. The hanger 120 may comprise a tab portion 124 and a base portion 125 adhered to the reservoir 104.

The tab portion 124 may comprise a sufficient drop distance K from any overhead structure, including the hook 122, to allow the hummingbirds 101, 103 sufficient space to fly-in, feed from the opening 111 or the feeding port 109, and exit without crowding the hummingbirds.

The hanger 120 may be secured to the reservoir 104 by support straps 128 which hold the base portion 125 to the reservoir 104 and extend around at least a portion of the reservoir 104. The straps 128 support the hanger 120 in manner configured to hold the weight of the feeder 1000 and to withstand environmental forces acting on the feeder 1000, e.g. movement from the wind or from an animal pushing on the feeder 1000 as it feeds. In other embodiments the hanger 120 may comprise other suitable contrivances upon which the feeder 1000 may be hung, including a string, strap, or a rod, including those disclosed in the pending U.S. patent application Ser. No. 14/947,928.

The weight of the reservoir 104 may be balanced on the hanger 120 as to prevent significant tipping or tilting of the reservoir, which may cause unwanted spillage of the feeding solution 105. In the embodiment shown in FIG. 12, the hanger is positioned on the top surface of the reservoir at a position Q that aligns a point of suspension S, where an aperture 126 in the tab portion 124 receives the hook 122, with the center of gravity 116. As the reservoir 104 is emptied of feed solution 105, the center of gravity follows generally a vertical path P, which maintains substantially equal weight on both sides of the point of suspension S. As a result, the feeder 1000 does not substantially tilt or pivot about the as the reservoir 104 empties.

Having thus described the present invention by reference to certain of its embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of embodiments. Accordingly, it is appropriate that the appended claims be construed broadly and in a manner consistent with the scope of the invention.

I claim:

1. An animal feeder, comprising:
a first surface extending in a first plane, wherein the first surface is configured to receive one or more feeder reservoirs;
a first feeder reservoir positioned on the first surface, wherein the first feeder is constrained from movement in a least a first horizontal plane; and
a second feeder reservoir positioned on the first surface, wherein the second feeder reservoir is constrained from movement in the first horizontal plane;
wherein the first feeder reservoir and the second feeder reservoir are constrained from movement in the first horizontal plane without a use of fasteners;
wherein the first feeder reservoir comprises:
a reservoir having a cavity containing a feed solution for animals; and wherein the reservoir comprises walls, and wherein the walls extend around the cavity without a pre-formed opening in the walls; and
wherein the walls comprise a first opening made by a user puncturing the walls with a punch.

2. The animal feeder of claim 1, wherein the walls comprise a second opening made by the user puncturing the walls.

3. An animal feeder, comprising:
a first surface extending in a first plane, wherein the first surface is configured to receive one or more feeder reservoirs;
a first feeder reservoir positioned on the first surface, wherein the first feeder reservoir is constrained from movement in a least one direction in a first horizontal plane independent of a use of fasteners;
wherein the first feeder reservoir comprises:
a reservoir having a cavity containing a feed solution for animals; and wherein the reservoir comprises walls, and wherein the walls extend completely around the cavity without a pre-formed opening in the walls, at least one of said walls having a frangible portion; and
wherein the walls comprise a first opening in said at least one of said walls having the frangible portion made by a user.

* * * * *